Jan. 8, 1924.

1,479,978

G. A. BOBRICK ET AL

LIQUID DISPENSER

Original Filed Feb. 17, 1916

Witnesses:

Inventors
Gabriel A. Bobrick
Arthur L. Bobrick
By Frederick R. Lyon
Attorneys

Patented Jan. 8, 1924.

1,479,978

UNITED STATES PATENT OFFICE.

GABRIEL A. BOBRICK AND ARTHUR L. BOBRICK, OF LOS ANGELES, CALIFORNIA.

LIQUID DISPENSER.

Original application filed February 17, 1916, Serial No. 78,814. Divided and this application filed November 27, 1920. Serial No. 426,679.

*To all whom it may concern:*

Be it known that we, GABRIEL A. BOBRICK and ARTHUR L. BOBRICK, citizens of the United States, residing at Los Angeles, in the county of Los Angeles and State of California, have invented a new and useful Liquid Dispenser, of which the following is a specification.

This invention relates to apparatus for dispensing measured or predetermined quantities of liquid, and particularly to means for measuring or predetermining the quantity to be dispensed, and dispensing or discharging the same, by means of the force exerted by a piston or plunger.

This application is a division of our previous application Serial No. 78,814 filed February 17, 1916.

The invention is particularly adapted for dispensing liquid soap in public lavatories such as the lavatories of sleeping cars, clubs, hotels and the like, wherefrom a single or common reservoir a number of dispensing devices are to be supplied either by gravity or pressure and where the tubes or channels connecting the reservoir with the dispensers are extended horizontally as well as vertically or bent in curves whereby the liquid is required to flow from the reservoir to the dispensers not simply vertically but horizontally and, in many cases, down and up again or vice versa.

An object of the invention is to construct a liquid dispenser which will prevent the entrance of air into the tubes supplying the liquid to the dispenser.

Other objects are to provide such a construction and interrelation of parts as to positively measure or determine the quantity of liquid dispensed by each operation of a plunger or piston; to prevent a continuous flow of liquid when the dispenser is in operation; to prevent all leakage from the discharge nozzles so that the liquid is discharged only in the predetermined quantity and at the predetermined time and there is no drip or waste of the liquid.

A further object is to provide such interrelation of parts as shall be extremely simple to make and install and which shall be efficient in operation and cheap to maintain.

The invention consists in the constructions and in the interrelations and combinations of parts hereinafter described and more particularly pointed out in the claims and will be more readily understood by reference to the accompanying drawings, forming a part of this specification, and in which:

Fig. 2 is a longitudinal sectional view of a dispensing device embodying our invention the same being shown in normal or closed position;

Fig. 3 is a similar view of the construction shown in Fig. 2, the parts being in operated position.

Figure 1:
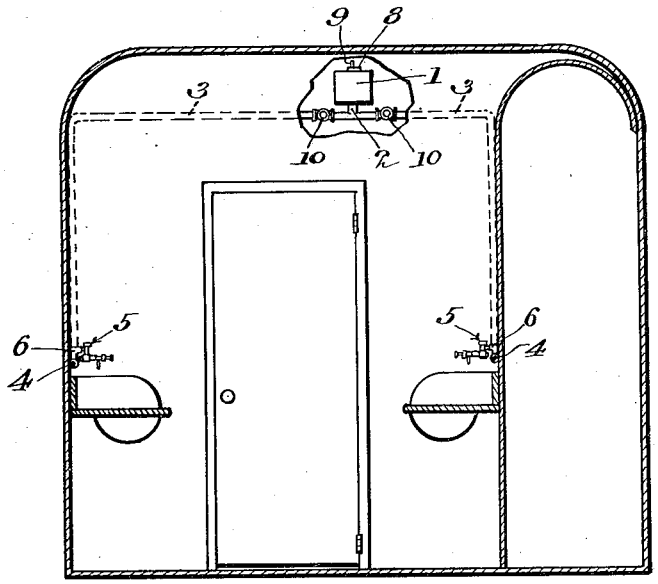
Figure 1 is a vertical sectional view of a lavatory, of a sleeping car, having installed therein a reservoir and dispensers embodying our invention.
Figure 1:
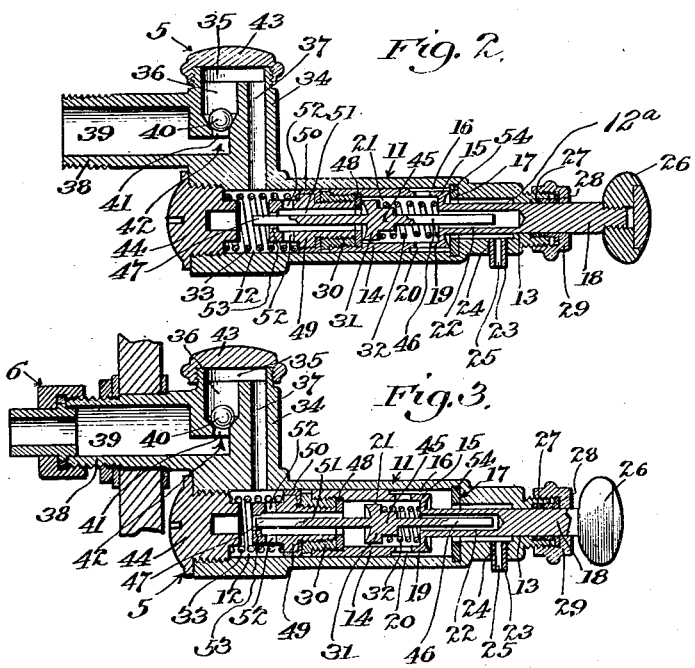

In Fig. 1 of the drawings we have shown or indicated a liquid supply reservoir 1 having a main tube 2 leading therefrom which is in turn connected to two branch tubes 3, each in turn connected with a tube 4 in turn communicating with the dispensing devices proper 5 which dispensing devices 5 are connected therewith by suitable means such, for instance, as the couplings 6. The reservoir 1 is preferably provided with an opening by which it may be readily filled. This opening is preferably closed by a cap 8. The cap 8 is preferably provided with a vent 9 and valves or cocks 10 may be interposed between the reservoir 1 and the dispensing devices to close communication between the reservoir and dispensing devices when desired.

The body 11 is provided with a plurality of connecting axially arranged bores 12, 12$^a$ and 13 of different diameters, adapted to accommodate the operating parts or mechanism of the dispenser.

A plunger or piston 14, provided with a bore or chamber 21, is mounted in the bore 12; the outer portion of the piston is slightly reduced in diameter to form a hub 15, thereby leaving an annular space or chamber 16 between the hub and the inner wall of bore 12. Thus it may be seen that the piston 14 divides the bore 12 into two chambers, i. e., the receiving chamber 12 near the inlet and the discharge chamber 16 near the outlet. The end or outer edge of the hub 15 is adapted to abut against the wall 17 of the chamber 16, to resist the outward movement of the piston and to act as a valve for closing communication between the chamber 16 and the bore 12$^a$ when the dispenser is at rest. A washer 54, made of rubber or other suitable material may be interposed between the outer edge of the hub 15 and the wall 17. A stem or piston rod 18 extends from the hub 15 outwardly through the bores 12ª and 13 to the outside of the body 11, which stem may be provided with a push-button or handle 26.

A stuffing box to compensate for possible wear of the piston rod 18 and wall of the bore 13 may be provided. Said stuffing box may consist of a cap 29 screwed onto the end of the body 11, a gland 28 and a suitable packing 27.

The wall of the piston bore 21 is threaded to receive a similarly threaded bushing 30; a plug 49, provided with channels 51 and 53 is screwed into the bushing 30. Said plug may also be provided with ports 52. The outer end of the plug 30 is provided with a flange 49 shaped to accommodate a packing or cup 50 made of leather or other suitable material.

The top of the bushing 30, within the hollow piston, serves as a seat for a valve 31, a washer 48 may be interposed between the valve seat and the valve 31. A spring 32, the tension of which must be such as to overcome the pressure of the liquid in the receiving chamber 12, holds the valve 31 seated when the dispenser is at rest.

The open end of the body 11 is closed with a plug 44. A spring 33 is located in the chamber 12. One end of the spring rests on the inner end of the plug 44, the other end against the flange 49. This spring forces the piston outwardly when pressure on the push-button 26 is released and it holds the valve 15 seated when the dispenser is at rest.

The chamber 21 communicates with the chamber 16 through the ports 20. Liquid is discharged from the dispenser through the channel 25 of the nozzle 23.

The valve 31 is provided with guiding rods 46 and 47; the hub 45 of the valve 31 holds the spring 32 in central position.

The chamber 21 within the piston is contracted in diameter to form a channel 22 which channel extends within the stem 18. The channel 53 in the plug 30 and the channel 22 in the stem 18 are slightly larger in diameter than the rods 46 and 47 and serve as guides for these rods which in turn guide the valve 31 and hold it in central position.

The tubular body 11 is provided with an extension 34, having within its walls a chamber 35 from the bottom of which a valve chamber 36 and a channel 37 extend downwardly, the latter connecting with the receiving chamber 12. An extension 38, provided with a bore 39 projects from the extension 34 and is adapted to be secured to the liquid supply tube by suitable means as the coupling 6, see Fig. 3. The bottom of the valve chamber 36 is suitably shaped to form a seat for the valve 40. The valve opening 41 connects the valve chamber 36 and the channel 42 which in turn leads to the bore 39. Communication is thus established between the source of liquid supply and the receiving chamber 12 of the dispenser through the bore 39, channel 42, inlet 41, valve chamber 36, chamber 35 and channel 37, when the valve 40 is raised from its seat by the gravity or pressure of the liquid in the supply reservoir. Preferably the chamber 35 is closed by a removable cap 43. By wholly or partially removing this cap 43 the air from the tubes 3, 4 may be expelled.

The construction of the dispenser is such that it can be operated with one hand. A person desiring a supply of liquid soap pushes the push button inwardly with the base of the palm of the hand, holding the palm under the discharge nozzle and receives in the palm of the hand the charges of liquid soap. The dispenser is double acting in that it discharges liquid both on the inward and outward strokes of the piston.

It is noted that the valve 15 positively prevents all passage of the liquid out of the dispenser when the piston is in its outward or closed position. It is also obvious that not only does the spring 33 exert its tension to hold this valve or hub 15 in contact with the wall 17 or with the interposed washer or packing 54, but that the pressure of the liquid from the reservoir also assists in holding this valve closed on its seat.

We claim:

1. The combination with a body having an open ended bore, the diameter of the bore being reduced at one end, means for closing the large end thereof, a hollow, spring-actuated, piston mounted in said bore and having a stem extending through the smaller bore and out beyond the body, said body having an outlet and having a hollow lateral extension communicating into said larger bore of the body, a valve chamber and valve in said extension, a discharge chamber being formed between the wall of said body and the outer end of said piston, a receiving chamber being formed at the end of said piston, the hollow piston being open to both the receiving and the discharge chambers, and a valve adapted to close the opening through said piston.

2. The combination with a body having an open ended bore, the diameter of the bore being reduced at one end, means for closing the large end thereof, a hollow, spring-actuated, piston mounted in said bore and having a stem extending through the smaller bore and out beyond the body, said body having an outlet and having a hollow lateral extension communicating with said larger bore of the body, a valve and valve chamber in said extension, a receiving chamber formed between said valve and the end of the piston, a discharge chamber being formed between the wall of said body and the other end of the piston, the piston communicating with the discharge chamber, a valve in said piston, a valve seat at the inner end of said piston, a spring normally holding said last-named valve seated, and a port communicating from said piston to said receiving chamber.

3. The combination of a body having a piston chamber, one end of such chamber being of reduced diameter, an opening through the end of said body, a spring-actuated piston mounted in said piston chamber and having a stem extending out through said opening, a hollow lateral extension communicating into said piston chamber, a valve chamber and independent valve mechanism in said extension adapted to close the passage of liquid through said extension into one end of said piston chamber upon the actuation of said piston, and valve means normally closing said piston chamber from discharge of liquid from the opposite end of said piston chamber.

4. The combination of a body having a piston chamber, a spring-actuated piston mounted in said chamber and having an actuating stem extending out from said body, a discharge outlet from which liquid from said piston chamber is discharged from one end of said chamber upon the actuation of said piston, and independent valve means for closing the inlet of liquid into the opposite end of said piston chamber upon the inward stroke of the piston.

GABRIEL A. BOBRICK.
ARTHUR L. BOBRICK.